United States Patent

Takei

[11] Patent Number: 6,164,226
[45] Date of Patent: Dec. 26, 2000

[54] METHOD FOR FORMING A TRIM COVER ASSEMBLY OF A DONUT-LIKE OR ANNULAR HEADREST FOR A VEHICLE SEAT

[75] Inventor: Yoshiyuki Takei, Akishima, Japan

[73] Assignee: Tachi-S Co., Ltd., Tokyo, Japan

[21] Appl. No.: 09/248,985

[22] Filed: Feb. 12, 1999

[51] Int. Cl.[7] .............................. B05B 97/00; B60N 2/48; B29C 65/08; B29C 65/48
[52] U.S. Cl. ................................. 112/475.06; 112/475.08; 297/220
[58] Field of Search ........................ 112/475.08, 475.06, 112/475.01; 297/391, 397, 220

[56] References Cited

U.S. PATENT DOCUMENTS

| | | | |
|---|---|---|---|
| 5,379,708 | 1/1995 | Moll et al. ........................ | 112/475.08 X |
| 5,405,190 | 4/1995 | Jeffcoat et al. . | |
| 5,896,823 | 4/1999 | Ishikawa et al. ............... | 112/475.08 X |

FOREIGN PATENT DOCUMENTS

| | | |
|---|---|---|
| 1135625 | 5/1989 | Japan . |
| 6312425 | 11/1994 | Japan . |
| 970837 | 3/1997 | Japan . |
| 9168449 | 6/1997 | Japan . |

*Primary Examiner*—Peter Nerbun
*Attorney, Agent, or Firm*—Browdy and Neimark

[57] ABSTRACT

A method for forming a trim cover assembly of a donut-like headrest for use on a vehicle seat. A reversed first cover unit is provided, which has been formed in a reversed state, with its reverse side exposed outwardly, and which is of a generally inverted-U-shaped configuration having a pair of outward openings defined at one side thereof and a pair of inward openings defined inwardly thereof. This reversed first cover unit is turned over into a normal state, with its outer side exposed outwardly. Then, a second cover unit is sewn with such pair of inward openings of said first cover unit, such as to provide an opened side, so that an annular opening is defined by, and along all the foregoing pair of outward openings of said first cover unit and that opened side of said second cover unit. Thereafter, a third cover unit is sewn, at its peripheral end, with and along the thus-defined annular opening of first and second cover units, whereby a donut-like trim cover assembly is produced. In this way, it is easy to accurately sew the cover units together to provide a good constant shape and quality of a resultant trim cover assembly of a donut-like headrest.

6 Claims, 3 Drawing Sheets

METHOD FOR FORMING A TRIM COVER ASSEMBLY OF A DONUT-LIKE OR ANNULAR HEADREST FOR A VEHICLE SEAT

BACKGROUND OF INVENTION

1. Filed of the Invention

The present invention relates to a method for forming a trim cover assembly of a headrest for use on a vehicle or automobile seat, and is particularly directed to a method for forming a trim cover assembly of an annular or donut-like headrest for use on a vehicle or automobile seat, prior to a foaming process wherein a liquid foaming base material is to be injected into an inner hollow of that trim cover assembly and cured to create a foam padding therein together with a headrest frame to form a headrest which can be used on the vehicle seat.

2. Description of Prior Art

Generally, in the process for forming an annular or donut-like headrest, there is a first step of sewing together plural separate cover section materials into a predetermined annular or donut-like, three-dimensional trim cover assembly. In this particular step, conventionally, as known from the Japanese Laid-Open U.M. Pub. No. 1-135625 for example, all the separate cover section materials are turned over to expose their respective reverse sides outwardly and sewn together into four separate reversed cover units, after which, those four cylindrical cover units are connected with one another, by sewing, in an annular or donut-like shape. The conventional process requires such troublesome and annoying steps where each of such many reversed cylindrical cover units must be turned over into a normal cylindrical cover unit with its outer side exposed outwardly, and further, a worker has to again reverse each of the normal cylindrical cover units and sew the end thereof with the reverse side of the end of another normal cover unit. Consequently, in most cases, an undesired dislocation and variation will occur among those many separate cover units, as a result of which, of is impossible to precisely sew them together to attain a constant good shape of the resultant sewn trim cover assembly.

SUMMARY OF THE INVENTION

In view of the above-stated drawbacks, it is a purpose of the present invention to improve a sewing operation in forming a trim cover assembly of a donut-like headrest and provide a constant good shape and quality of a resultant trim cover assembly.

In order to achieve such purpose, in accordance with the present invention, there are basically provided the steps of:

providing a first cover section material means which is of generally inverted-U-shaped and three-dimensional configuration, having an inward opened side defined inwardly thereof, and a pair of outward openings defined at one side thereof;

providing a second cover section material means which has a whole length smaller than a whole length of the first cover section material means;

reversing those first and second cover section material means, with their respective reverse sides being exposed outwardly;

sewing the second cover section material means with the inward opened side of first cover section material means, such as to define a pair of inward openings adjacent to the pair of outward openings of said first cover section material means, to thereby provide a first cover unit which is of a generally inverted-U-shaped, cylindrical configuration and is in a reversed state;

turning over the first cover unit completely into a normal state of said first cover unit, with all the outer sides of first and second cover section material means exposed outwardly;

providing a second cover unit;

bending this second cover unit in a generally "U" shaped fashion, with the outer side thereof exposed outwardly, such as to define an outward opening at one side thereof;

sewing the thus-bent second cover unit with the pair of inward openings associated with the foregoing normal state of first cover unit, such that the two outward openings associated with the first cover unit and the outward opening associated with the second cover unit cooperate with one another to define an annular end therealong;

providing a third cover unit which has, formed therein, an opening for allowing a headrest frame to be passed therethrough; and sewing a peripheral end of the third cover unit with and along the annular end associated with both first and second cover units.

Other features and advantages of the present invention will become apparent from reading of the descriptions hereinafter, with reference to the annexed drawings.

DETAILED DESCRIPTION OF PREFERRED EMBODIMENT OF THE INVENTION

Referring to FIGS. 1 through 6, there is illustrated a preferred mode of a method of forming a trim cover assembly of annular or donut-like headrest, as generally designated by (HT), in accordance with the present invention.

Figure 1:
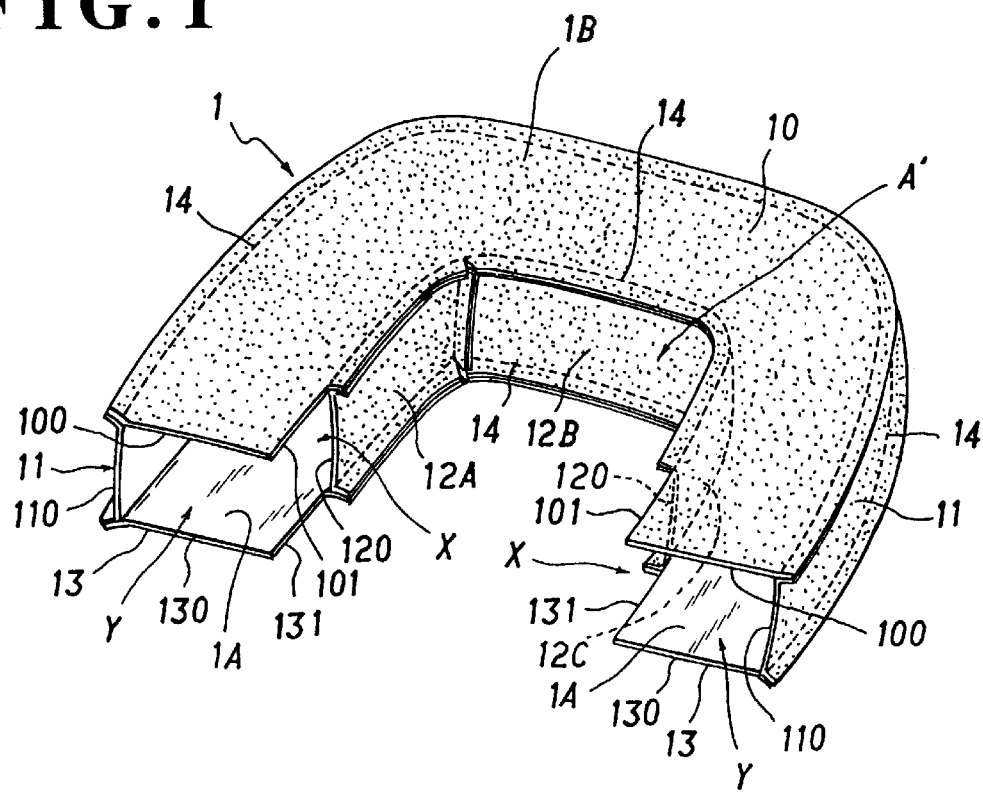
FIG. 1 is a schematic perspective view of a first cover unit formed by sewing in accordance with the present invention.
Figure 5:
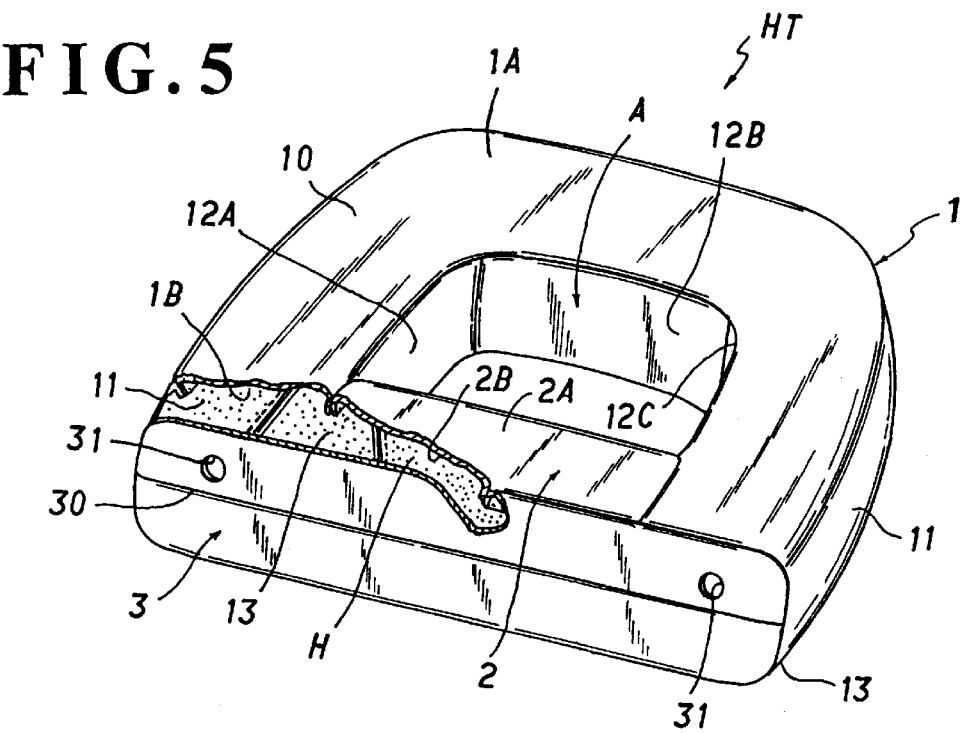
FIG. 5 is a partly broken schematic perspective view of a resultant trim cover assembly in accordance with the present invention.

FIG. 1 shows a first three-dimensional cylindrical cover unit (1) of generally inverted-U-shaped configuration, which forms an upper part of a resultant annular or donut-like trim cover assembly designated by (HT) in FIG. 5. As understandable and viewed from FIG. 1, in accordance with the present, the first cover unit (1) has been formed in a reversed state and in a generally cylindrical manner having a hollow or conduit therein. The first cover unit (1) is formed as such by sewing together a generally "U" shaped first cover section material (10), an outward lateral cover section material (11), a pair of inward lateral cover section materials (12A)(12C), an inward intermediate cover section material (12B) (to be defined between the two inward lateral cover section materials (12A)(12C)), and a generally "U" shaped second cover section material (13). Designations (14) denote sewing threads used for sewing those cover section materials. Hence, designations (1A) and (1B) represent an outer side of the unit (1) and a reverse side of the unit (1), respectively. It should be understood that, for that purpose, all the cover section materials (10, 11, 12B, 12A, 12C and 13) are in the state of being reversed, with their respective reverse sides outwardly, and sewn together as shown in FIG. 1. Designation (A') denotes a through-hole defined in this first cover unit (1).

The two inward lateral cover section materials (12A) (12C) and intermediate cover section material (12B) in the aggregate are small in whole length relative to both first and second cover section materials (10)(13), whereupon an inward opening (X) is defined among the inward end (101) of first cover section material (10), one end (120) of inward lateral cover section material (12A) and the inward end (131) of second cover section material (13). As shown in FIG. 1, there are defined a pair of such inward openings (X) facing toward each other in the through-hole (A') or inwardly of the first cover unit (1). Further, as in FIG. 1, an outward opening (Y) is defined among the outward end (100) of first cover section material (10), one end (110) of outward lateral cover section material (11) and the outward end (130) of second cover section material (1-), and therefore, a pair of such outward openings (Y) are defined outwardly of and at the lower side of first cover unit (1).

Figure 2:
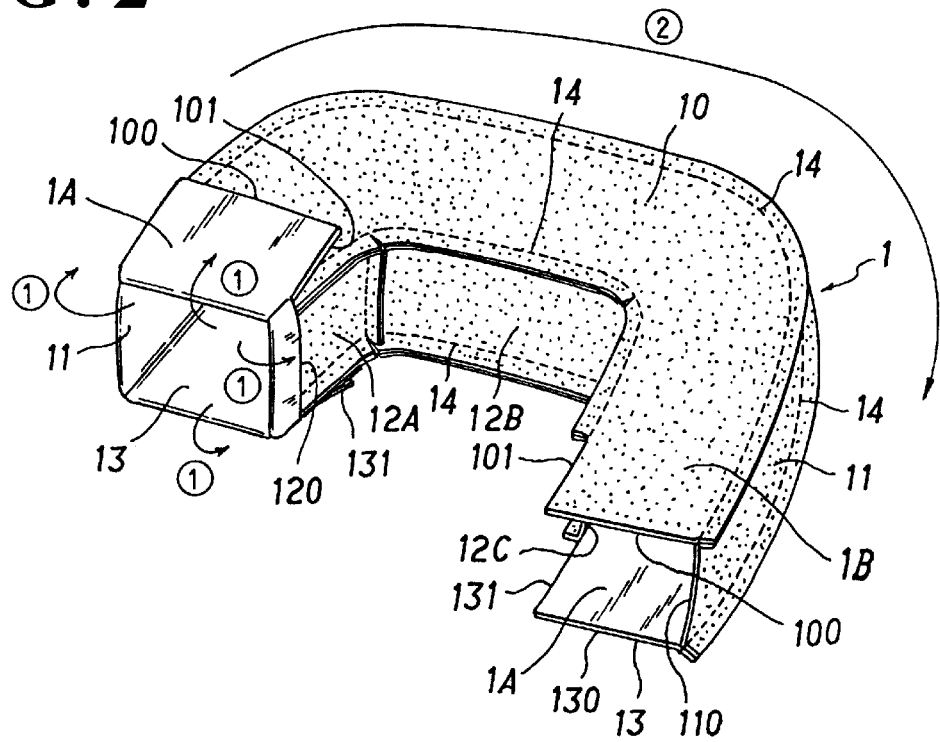
FIG. 2 is a diagram showing how to turn over the first cover unit.
Figure 3:
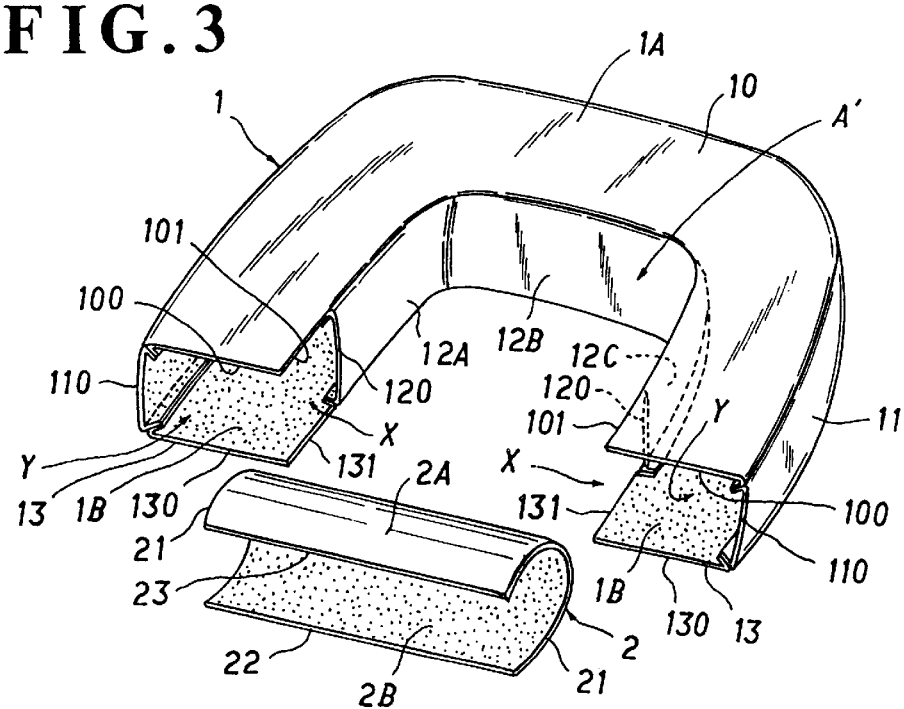
FIG. 3 is a schematic perspective view showing a completely turned-over first cover unit and a second cover unit to be sewn therewith.

Next, as indicated by the arrows 1 in FIG. 2, one end of the first cover unit (1), or the ends designated by (1CO), (110), (130), (101), (131) and (120) are turned over, with the outer side (1A) of first cover unit (1) exposed, and then, by continuing on to turn over the remaining portion of first cover unit (1) as indicated by the arrow 2 in FIG. 2, the whole of first cover unit (1) is completely turned over into a normal state as shown in FIG. 3, such that its outer side (1A) is exposed outwardly, while its reverse side (1E) is situated within the inward hollow of cover unit (1).

In accordance with the present invention, as shown in FIG. 3, a second cover unit (2) is provided, which is formed from one unitary cover material having a width generally equal to a width between the two inward lateral cover section materials (12A)(12C) of first cover unit (1) and having a length generally equal to a whole length of all the ends (101), (120) and (131) associated with the same first cover unit (1). This second cover unit (2) is bent in a generally "U" shape, such that both lateral ends (21)(21) thereof correspond to all those ends (101), (120) and (131) associated with the first cover unit (1), and that the outer side (2A) thereof is exposed outwardly, while the reverse side (2B) thereof lies inwardly of the second cover unit (2) per se. Then, the second cover unit (2) is sewn and connected, at both ends (21)(21) thereof, with and along the respective pair of the ends (101, 120 and 131) associated with the first cover unit (1), as seen from FIG. 4, such that the two ends (22) and (23) of the second cover unit (2) extend on the same line with the outward ends (100) and (130) of first cover unit (1). Thus, it is observed form FIG. 4 that an annular end is defined by and along all those ends (100, 110, 130, 22, 23) at the lower side of the resultant first cover unit (1).

Figure 4:
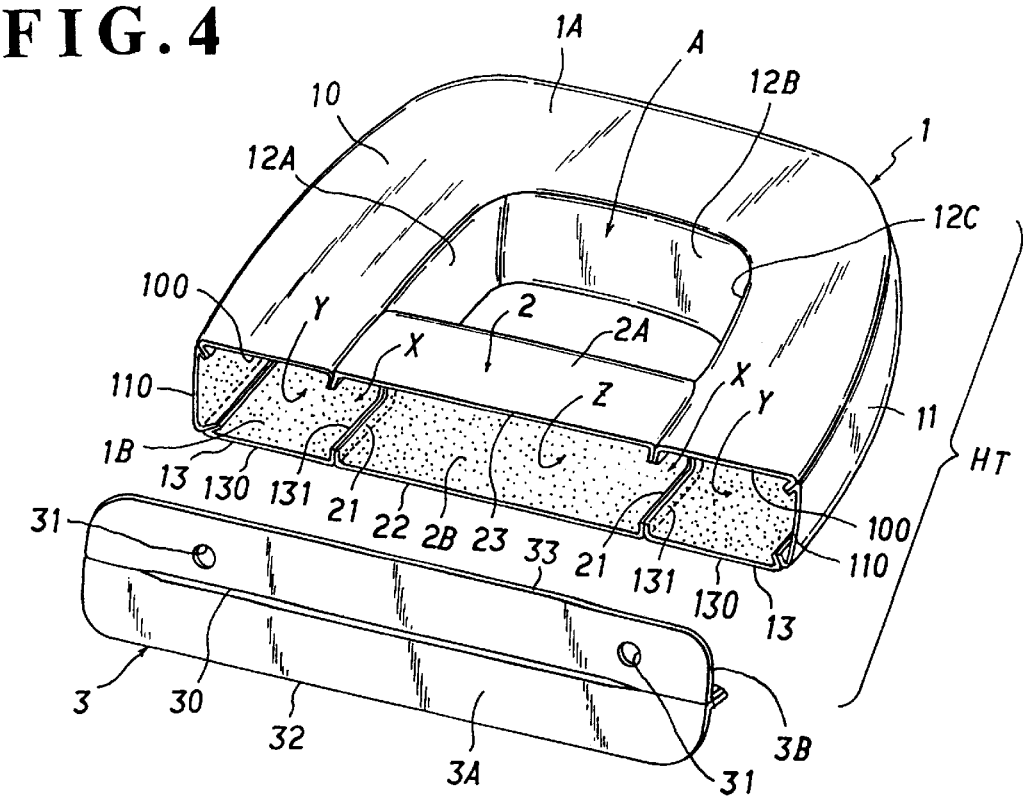
FIG. 4 is a schematic perspective view showing one sewn unit of those first and second cover units, and a third cover unit to be sewn therewith.

As can be seen in FIG. 4, such connection of second cover unit (2) with the first cover unit (1) results in assuming a donut-like configuration having a through-hole (A) centrally thereof, and also communicates the inward hollow (Z) of second cover unit (2) with both two inward openings (X)(X). Thus, the inward hollow (Z) of second cover unit (2) opens outwardly in the same direction wherein both two outward openings (Y)(Y) orients.

Next, a third cover unit (3) is provided, which is formed in the illustrated flat, thin-plate-like fashion having an outer size generally equal to the size of all the openings (at Y, Y and Z) associated with the first and second cover units (1) and (2), and having an elongated opening (30) and a pair of holes (31)(31) formed therein. This third cover unit (3) is sewn and connected, at its peripheral ends (32), with and along the annular ends (100, 110, 130, 22, 23) of first and second cover units (1) and (2). In this particular step, in accordance with the present invention, a worker can first widen the elongated opening (30) and pass his or her hands through that opening (30), thereby permitting himself or herself to effect easy and accurate bending of both peripheral ends (32) of third cover unit (3) and annular ends (100, 110, 130, 22, 23) of first and second cover units (1) and (2) in the direction inwardly of both first and third cover units (1) and (3), which in turn permits him or her to easily effect an accurate sewing of all those ends together via the widened elongated opening (30).

Preferably, the elongated opening (30) may be of such a size that can be widened for easy access of worker's hands to all those ends of first, second and third cover units (1, 2, 3) and for permitting him or her to bend them inwardly and sewn them all together.

As a result, there is produced a resultant trim cover assembly (HT) of an annular or donut-like shape, having an annular hollow or conduit (H) defined therein, as in FIG. 5.

Figure 6:
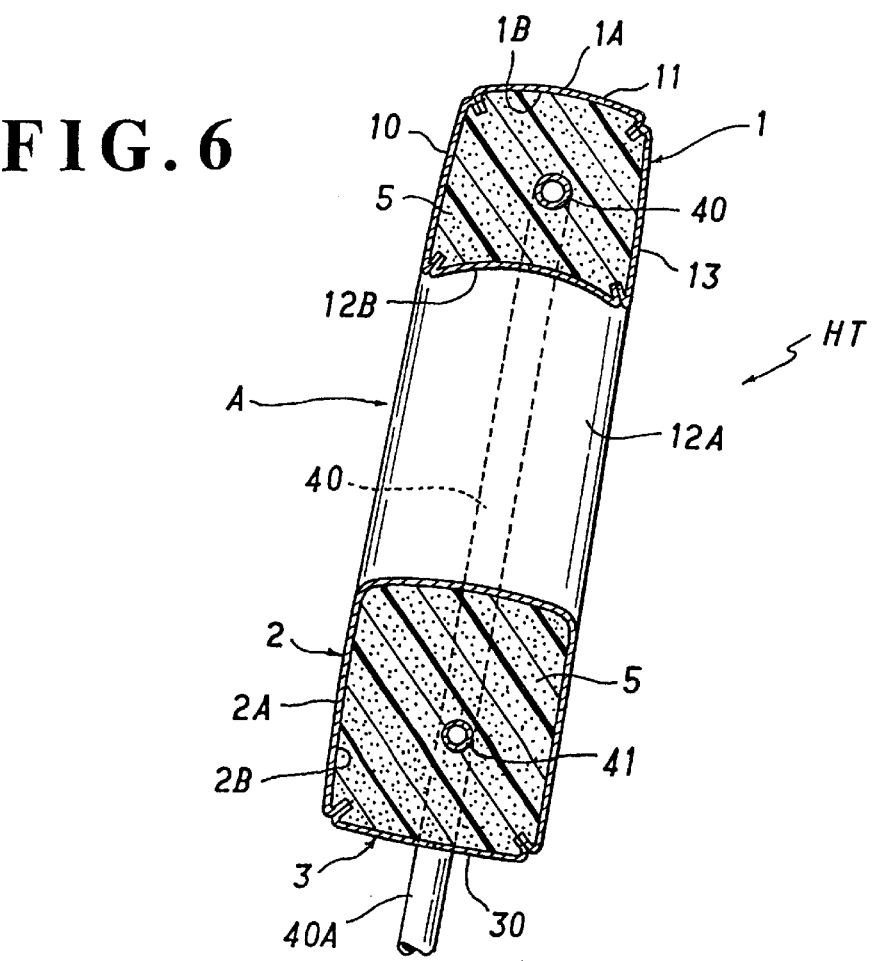
FIG. 6 is a sectional view showing a donut-like headrest formed by subjecting the resultant trim cover assembly to a foaming process together with a headrest frame.

Thereafter, as understandable from FIG. 6, a headrest frame (40) is inserted via the elongated opening (30) into within the thus-formed trim cover assembly (HT) and placed therein, such that the whole upper part of the headrest frame (40) and connecting frame section (41) extend in and along the annular conduit (H) of trim cover assembly (HT), while the two stay portions (40A) pass through the respective two hoes (31) of trim cover assembly (HT) to the outside. Though not. shown, then, a liquid foaming base material is injected into the trim cover assembly (HT) and a foaming is effected thereto, using a known suitable foaming die device, so that such donut-like headrest as in FIG. 6 is produced. Designation (3) denotes a foam padding created from the foaming base material and filled in the donut-like trim cover assembly (HT).

Accordingly, in accordance with the present invention, it is appreciated that, since the first cover unit (1) is formed in the reversed state, with its reverse side (1B) exposed outwardly, and then turned over into a normal state, with its outer side (1A) exposed outwardly, one piece of the second cover unit (2) can easily be sewn to the inward opened side (at (X)) of first cover unit (1) without dislocation and variation of the cover section materials from one another during the sewing processes, hence eliminating such troublesome conventional steps of forming a donut-like headrest as stated previously, and insuring a highly efficient and accurate sewing operations in forming a trim cover assembly of donut-like headrest. Moreover, the third cover unit (3) can be sewn accurately with both first and second cover units (1) and (2) via the elongated opening (30), which eliminates any objectionable projection and exposure of sewn margins from the resultant trim cover assembly, thus improving an outer aesthetic appearance of trim cover assembly of donut-like type.

While having described the present invention above, it should be understood that the invention is not limited to the illustrated embodiments, but any other modifications, replacements and additions may be applied thereto without departing from the scopes of the appended claims.

What is claimed is:

1. A method for forming trim cover assembly of a donut-like headrest, comprising the steps of:

providing a first cover section material means which is of generally inverted-U-shaped and three-dimensional configuration, having an inward opened side defined inwardly thereof, and a pair outward openings defined at one side thereof;

providing a second cover section material means which has a whole length smaller than a whole length of said first cover section material means;

reversing said first and second cover material means, with their respective reverse sides being exposed outwardly;

sewing said second cover section material means with the inward opened side of said first cover section material means, such as to define a pair of inward openings adjacent to said pair of outward openings of said first cover section material means to thereby provide a first cover unit which is of a generally inverted-U-shaped, cylindrical configuration and is in a reversed state;

turning over said first cover unit completely into a normal state of said first cover unit in which all outer sides of said first and second cover section material means opposite to the reverse sides respectively thereof are exposed outwardly;

turning over said first cover unit completely into a normal state of the first cover unit, with all the outer sides of said first and second cover section material means exposed outwardly;

providing a second cover unit;

bending said second cover unit in a generally "U" shaped fashion, with the outer side thereof exposed outwardly, such as to define an outward opening at one side thereof;

sewing the thus-bent second cover unit with said pair of inward openings associated with said normal state of first cover unit, such that said pair of outward openings associated with said first cover unit and said outward opening associated with said second cover unit cooperate with one another to define an annular end therealong;

whereupon a normal state of said first and second cover units having said annular end is provided, with all their respective outer sides exposed outwardly;

providing a third cover unit which has, formed therein, an opening for allowing a headrest frame to be passed therethrough; and sewing said third cover unit directly with said normal state of first and second cover units in such a manner that a peripheral end of said third cover unit is sewn with and along the annular end of said normal state of said first and second cover units.

2. The method as define in claim 1, wherein said first cover section material means comprises a pair of generally inverted-U-shaped cover section materials and an outward lateral cover material, wherein said first cover unit is formed by sewing together said pair of generally inverted-U-shaped cover section materials and said outward lateral cover material in such a manner as to define said outward opened side inwardly thereof, and wherein, said second cover section material means comprises at least one second cover section material having a whole length smaller than a whole length of all said pair of generally inverted-U-shaped cover section materials and outward lateral cover material.

3. The method as defined in claim 1, wherein said second cover unit comprises one piece of cover material.

4. A method for forming trim cover assembly of a donut-like headrest, comprising the steps of:

providing a first cover section material means which is of generally inverted-U-shaped and three-dimensional configuration, having an inward opened side define inwardly thereof, and a pair of outward openings defined at one side thereof;

providing a second cover section material means which has a whole length smaller than a whole length of said first cover section material means;

reversing said first and second cover material means, with their respective reverse sides being exposed outwardly;

sewing said second cover section material means with the inward opened side of said first cover section material means, such as to define a pair of inward openings adjacent to said pair of outward openings of said first cover section material means, to thereby provide a first cover unit which is of generally inverted-U-shaped, cylindrical configuration and is in a reversed state;

turning over said first cover unit in a direction from one of said pair of inward openings as well as one of said pair of outward openings towards another of said pair of inward openings as well as another of said outward openings, so that the first cover unit is turned over completely into a normal state of the first cover unit in which all outer sides of said first and second cover section material means opposite to the reverse sides respectively of them are exposed outwardly;

providing a second cover unit;

bending said second cover unit in a generally "U" shaped fashion with the outer side thereof exposed outwardly, such as to define an outward opening at one side thereof;

sewing the thus-bent second cover unit with said pair of inward openings associated with said normal state of the first cover unit, such that said pair of outward openings associated with said first cover unit and said outward opening associated with said second cover unit cooperate with one another to define an annular end therealong, whereupon a normal state of said first and second cover units having said annular end is provided, with all their respective outer sides exposed outwardly;

providing a third cover unit which has, formed therein, an opening for allowing a headrest frame to be passed therethrough; and widening said opening of the third cover unit; and then effecting a direct sewing of the third cover unit, via the thus-widened opening, to said normal state of the first and second cover units in such manner that a peripheral end of said third cover unit is sewn along said annular end associated with said normal state of the first and second cover units.

5. The method as defined in claim 4, wherein said first cover section material means comprises a pair of generally inverted-U-shaped cover section materials and an outward lateral cover material, wherein said first cover unit is formed by sewing together said pair of generally inverted-U-shaped cover section materials and said outward lateral cover material in such a manner as to define said inward opened side inwardly thereof, and wherein, said second cover section material means comprises at least one second cover section material having a whole length smaller than a whole length of all said pair of generally inverted-U-shaped cover section materials and outward lateral cover material.

6. The method as defined in claim 4, wherein said second cover unit comprises one piece of cover material.

* * * * *